United States Patent
Erdman, Jr.

(10) Patent No.: US 9,528,331 B1
(45) Date of Patent: Dec. 27, 2016

(54) PIPE FITTING ASSEMBLY APPARATUS

(71) Applicant: Abe B Erdman, Jr., Spivey, KS (US)

(72) Inventor: Abe B Erdman, Jr., Spivey, KS (US)

( * ) Notice: Subject to any disclaimer, the term of this patent is extended or adjusted under 35 U.S.C. 154(b) by 243 days.

(21) Appl. No.: 14/316,450

(22) Filed: Jun. 26, 2014

Related U.S. Application Data

(60) Provisional application No. 61/841,981, filed on Jul. 2, 2013.

(51) Int. Cl.
| | |
|---|---|
| B23P 19/04 | (2006.01) |
| E21B 19/00 | (2006.01) |
| B25B 13/50 | (2006.01) |
| B25B 28/00 | (2006.01) |
| E21B 19/16 | (2006.01) |

(52) U.S. Cl.
CPC ............ *E21B 19/163* (2013.01); *B23P 19/04* (2013.01); *B25B 28/00* (2013.01)

(58) Field of Classification Search
CPC .............. B27C 7/02; B27C 7/04; B27C 7/00; B25B 1/00; B25B 1/20; B25B 13/5008; B25B 13/5041; B25B 13/5058; E21B 19/161; E21B 19/164; E21B 19/167
USPC ................... 29/243.55, 243.526, 281.1, 240, 266,29/792, 523; 269/41, 43, 45, 156, 246, 320; 81/52
See application file for complete search history.

(56) References Cited

U.S. PATENT DOCUMENTS

| | | | | |
|---|---|---|---|---|
| 443,312 | A * | 12/1890 | Bode | B25B 13/48 269/251 |
| 1,216,600 | A * | 2/1917 | Paschall | B23Q 1/48 269/246 |
| 1,401,405 | A * | 12/1921 | Hole | E21B 19/16 173/164 |
| 1,498,032 | A * | 6/1924 | Hamer | E21B 19/161 81/52 |
| 2,540,553 | A * | 2/1951 | Shobe | B25B 5/147 254/106 |
| 2,546,224 | A | 3/1951 | Johansen | |
| 2,680,395 | A * | 6/1954 | Christiansen | B25B 1/2405 269/110 |
| 2,871,743 | A | 2/1959 | Kelley | |
| 3,500,708 | A | 3/1970 | Wilson | |
| 3,832,918 | A | 9/1974 | Lang et al. | |
| 4,501,335 | A * | 2/1985 | Gann | E21B 19/162 173/164 |
| 4,545,569 | A * | 10/1985 | Schroder | B29C 65/7802 269/37 |
| 4,779,856 | A * | 10/1988 | Beeler | B23K 37/0533 269/287 |
| 4,844,171 | A * | 7/1989 | Russell, Jr. | E21B 19/167 166/377 |

(Continued)

*Primary Examiner* — Joseph J Hail
*Assistant Examiner* — Jon Taylor

(57) ABSTRACT

An apparatus for assembling pipe fittings includes a base, an adjustable vice assembly and a pipe wrench turning unit. The adjustable vice assembly is mounted to the base and is operable for securely holding a first pipe fitting. A second pipe fitting is loosely threaded on to the first threaded pipe fitting. A pipe wrench engages the second pipe fitting. A motorized pipe wrench turning unit includes a drive shaft which rotates an offset member which, in turn, engages and turns the pipe wrench handle in order to screw the second pipe fitting on to the first pipe fitting. The apparatus for assembling pipe fittings may also be operated in a reverse fashion to disassemble pipe fitting sub-assemblies.

10 Claims, 5 Drawing Sheets

(56) References Cited

U.S. PATENT DOCUMENTS

| | | | | |
|---|---|---|---|---|
| 4,986,152 | A | * | 1/1991 | Sammons ............ B23D 55/046 144/134.1 |
| 5,062,326 | A | * | 11/1991 | Goldschmidt ...... B25B 13/5058 81/57.32 |
| 7,246,546 | B1 | | 7/2007 | Knoblock et al. |
| 8,141,459 | B2 | | 3/2012 | Myburgh |
| 2010/0102763 | A1 | * | 4/2010 | Kagoshima .............. B60K 6/46 318/380 |
| 2011/0288711 | A1 | * | 11/2011 | Yanagisawa .......... B60W 10/26 701/22 |

* cited by examiner

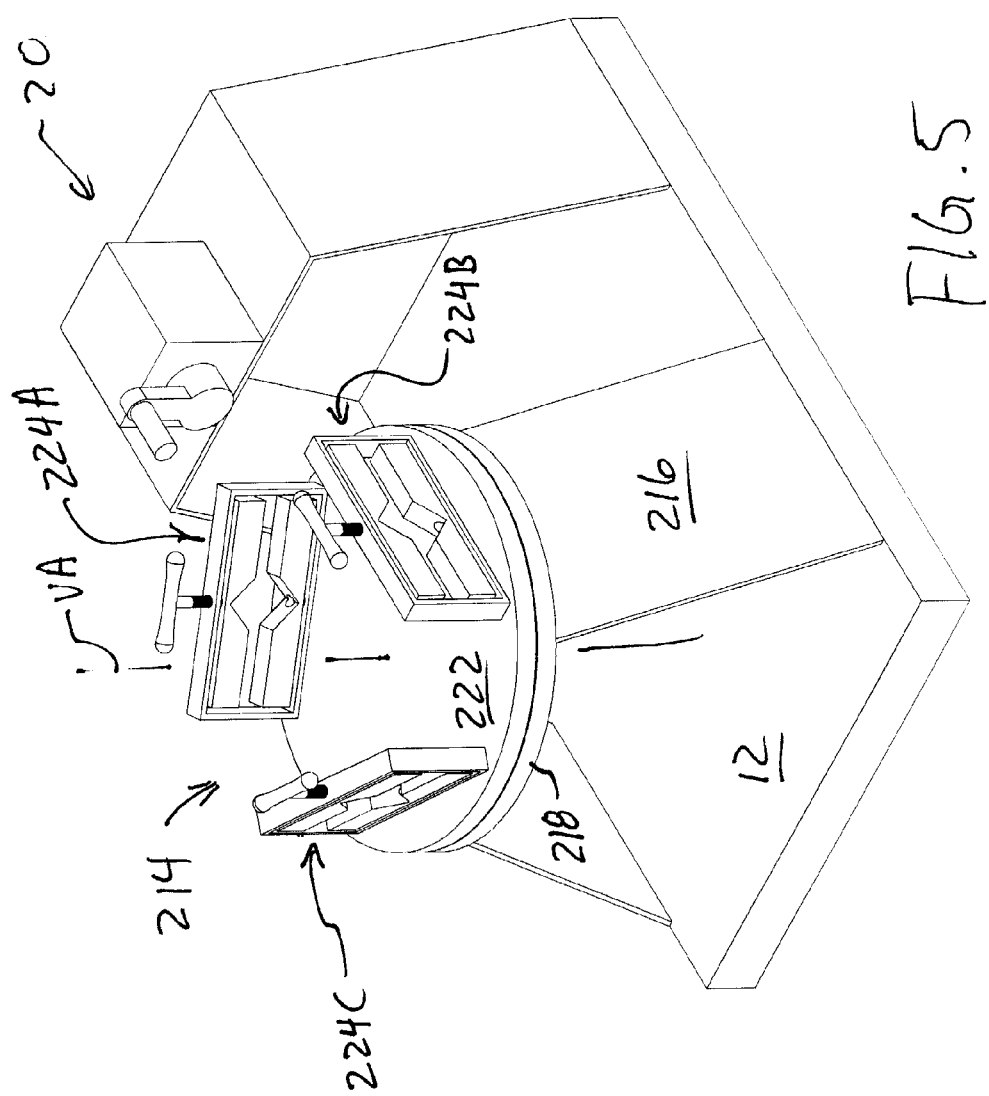

PIPE FITTING ASSEMBLY APPARATUS

CROSS REFERENCES TO RELATED APPLICATIONS

This application claims the benefit of U.S. Provisional Patent Application No. 61/841,981 filed on Jul. 2, 2013 which is incorporated herein by reference.

FIELD OF THE INVENTION

This invention relates to an apparatus for assembling threaded pipe fittings.

BACKGROUND

The construction of oil field tank facilities often requires screwing together and unscrewing relatively large diameter threaded pipe fittings and pipe connections. This work is typically performed by hand and often requires excessive amounts of torque applied by hand pipe wrenches in order to screw together sub-assemblies including pipe fittings and pipe fitting connections. Often, oil field workers must extend pipe wrench handles with "cheater bars" and perform dangerous pipe wrenching operations in order to securely join large diameter pipe fittings in order to complete threaded pipe fitting assemblies. Further, it is also occasionally necessary to disassemble pipe fittings and pipe connections. These operations can require even more torque than assembly operations. What is needed is a powered apparatus which is operable for screwing together pipe fittings and pipe connections and which is also operable for unscrewing pipe fittings and pipe connections.

SUMMARY

The above stated need is met by a pipe fitting assembly apparatus for screwing together pipe fittings and pipe fitting connections. The pipe fitting assembly apparatus includes a base, an adjustable vice assembly and a pipe wrench turning unit. The vice assembly is mounted to the base and is operable for securely holding a pipe fitting assembly and, preferably, the position of the vice assembly is also adjustable. The pipe fitting sub-assembly typically includes a first threaded pipe fitting or pipe fitting and a second corresponding threaded pipe fitting. The skilled reader should understand that by "pipe fitting" the applicant may be referring to a section of pipe which usually presents male threads at one end or may present a set of female threads. The "first pipe fitting" is held by the adjustable clamp structure. In most cases, the "second pipe fitting" is meant to refer to what is known by the skilled reader as a "fitting" or a "connection". Further, by "pipe fitting", especially in the case of the "second pipe fitting" the applicant means a fitting or connection selected from a group including but not limited to: 45° fittings, 90° fittings, T fittings, valves, check valves, unions and nipples. These are merely given as examples of the types of fittings and connections that the present pipe fitting assembly apparatus can assemble. So, the present apparatus is used to screw a second pipe fitting on to a first pipe fitting. The first pipe fitting is securely held by the vice assembly and the second fitting is loosely screwed on to the first pipe fitting. The first and second pipe fittings are aligned along an axis of rotation. A pipe wrench engages the second pipe fitting so that the handle of the pipe wrench extends normally with respect to the axis of rotation. The pipe wrench turning unit includes a drive unit mounted at least indirectly to the base. The drive unit powers a drive shaft which rotates about an axis which is preferably aligned with the axis of rotation of the pipe fittings. An arm assembly is fixed to the shaft. The arm presents an offset member which is generally parallel to and spaced away from the drive shaft. The offset member is positioned to urge the pipe wrench handle when the drive unit rotates the shaft. This action causes the second pipe fitting to be screwed onto the first pipe fitting. After the pipe fittings are screwed tightly together, the completed pipe fitting assembly can be removed from the vice assembly so that the vice assembly can receive and securely hold a next first pipe fitting. A reverse process can be conducted to unscrew and disassemble a pipe fitting sub-assembly. Accordingly, the drive unit is arranged to be operable in a reverse mode so that pipe fitting sub-assemblies may be disassembled.

BRIEF DESCRIPTION OF THE DRAWINGS

FIG. 5 is a perspective view of an optional turntable clamp structure.

DETAILED DESCRIPTION

Figure 1:
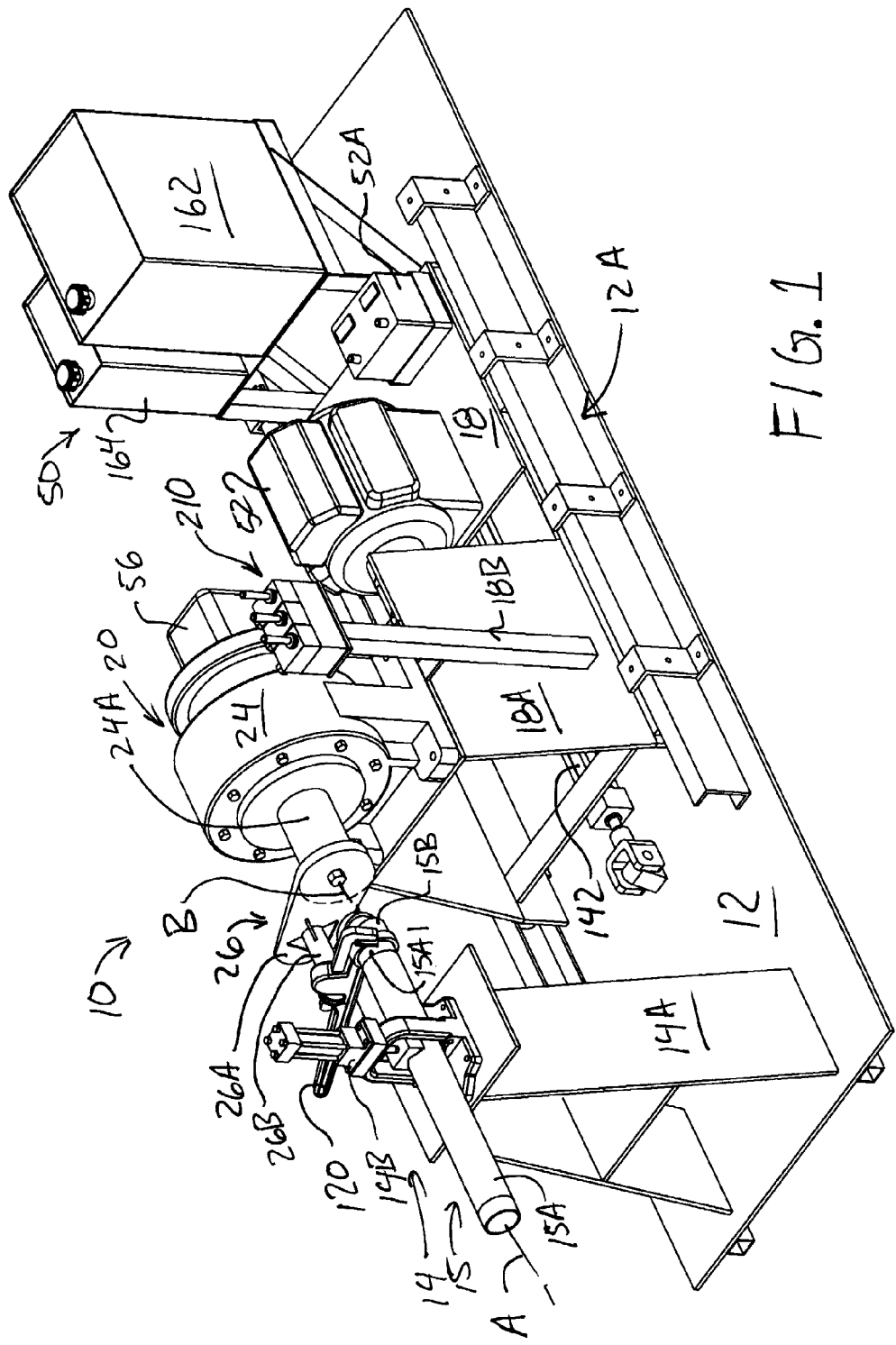
FIG. 1 is a first perspective view of the pipe fitting assembly apparatus.
Figure 2:
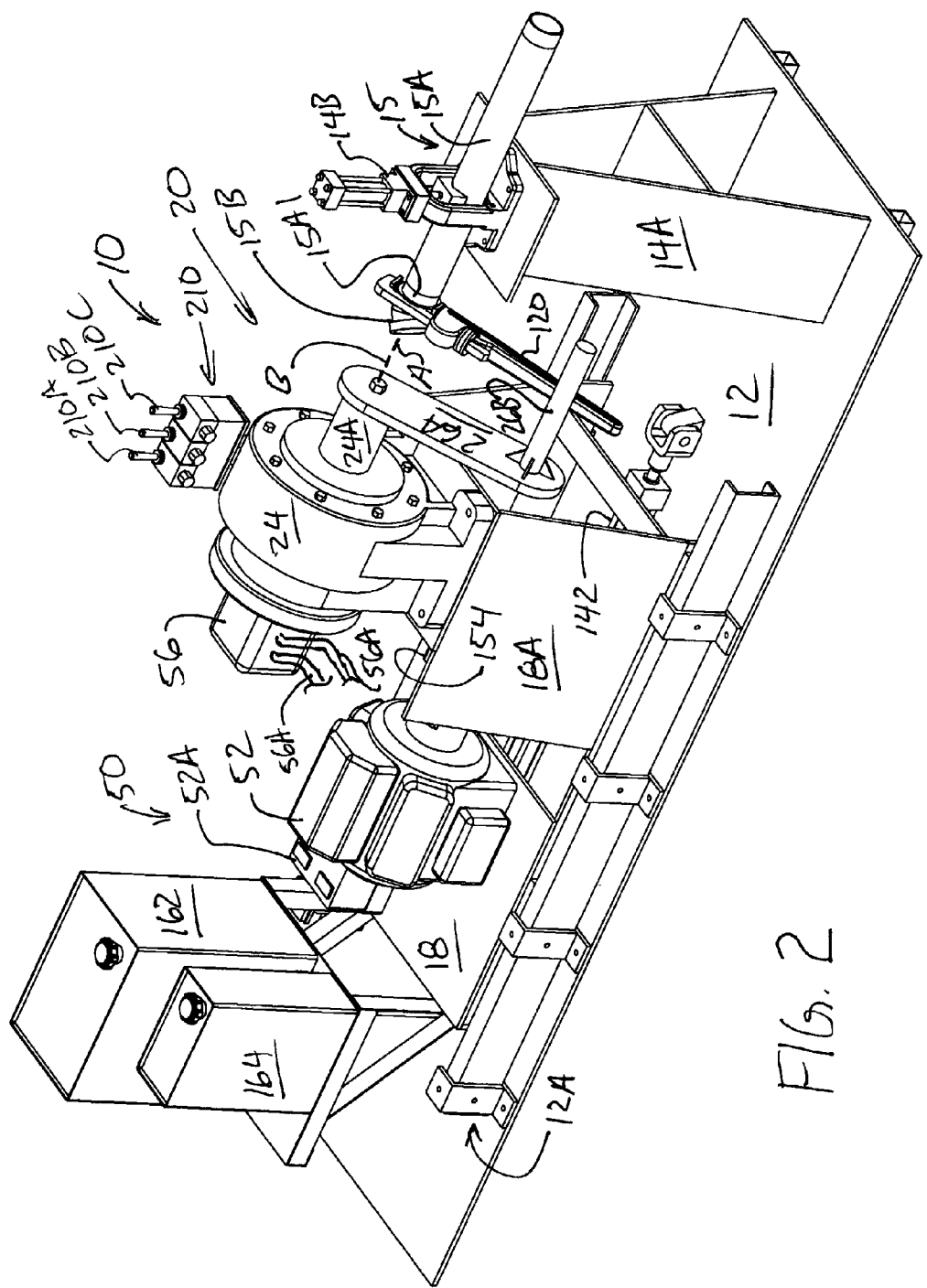
FIG. 2 is a second perspective view of the pipe fitting assembly apparatus.

Referring to the drawings, FIGS. 1 and 2 illustrate a pipe fitting assembly apparatus 10. As can be seen in FIGS. 1 and 2, pipe fitting assembly apparatus 10 includes a base 12, a vice assembly 14, a pipe wrench 120, a pipe wrench turning portion 20 and a drive unit 50.

Figure 4:
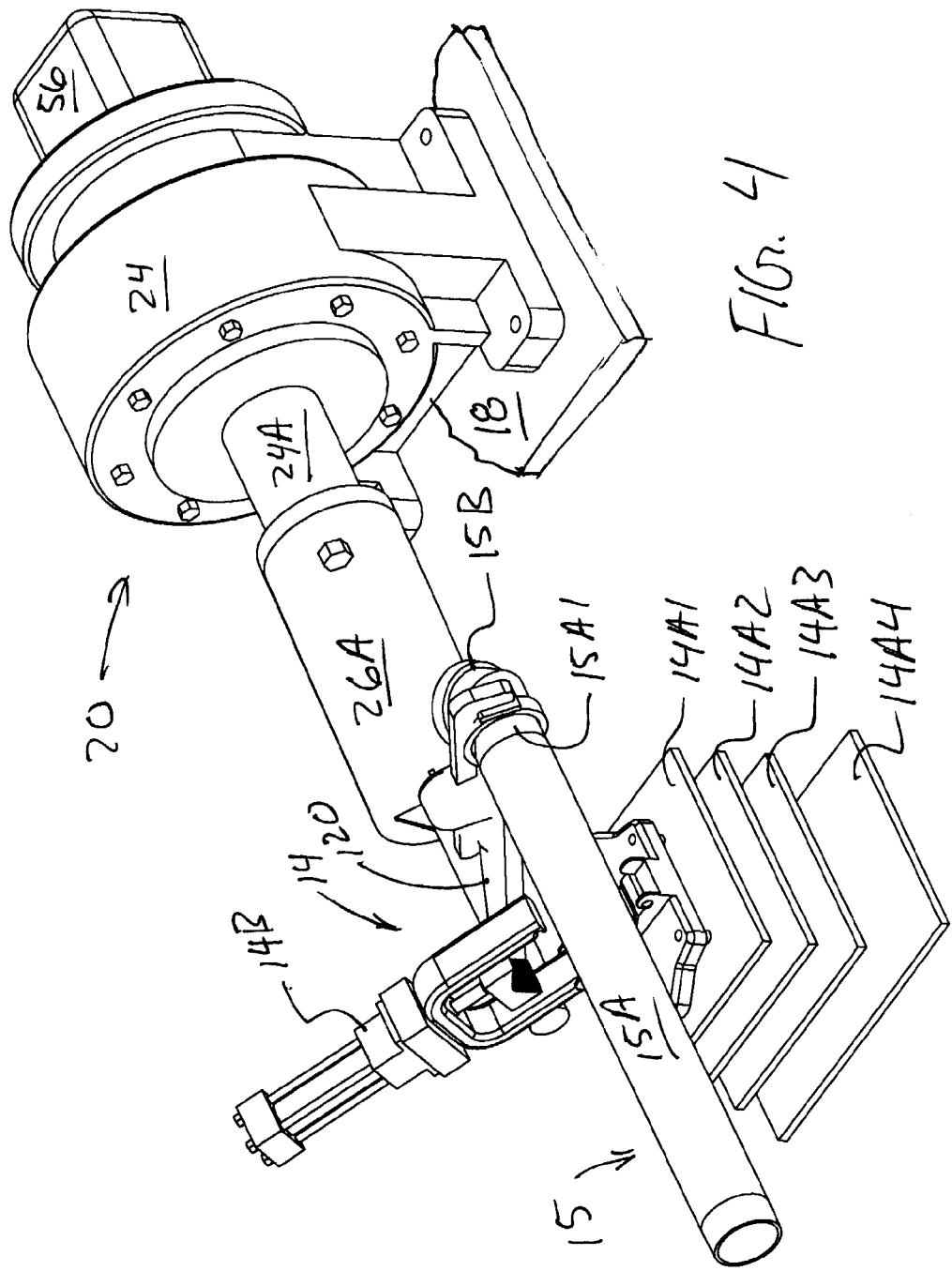
FIG. 4 is a close up perspective view of the vice assembly and the pipe wrench turning portion of the pipe fitting assembly apparatus shown including a plurality of shim plates.

Vice assembly 14 is mounted to base 12 and includes a stand 14A and a vice 14B which is adapted for securely holding a pipe fitting assembly 15. Vice 14B may be hydraulically actuated and controllable by means of hydraulic controls which will be described in greater detail below. Also, preferably, the position of vice assembly 14 is adjustable by means of using shim plates as shown in FIG. 4 or by other means as might be used by those who are skilled in the art. In this example, pipe fitting subassembly 15 includes a first pipe fitting 15A which is secured to vice 14B. First pipe fitting 15A is preferably aligned on an axis of rotation A. In this example, first pipe fitting 15A presents a set of male threads at its distal end which is oriented toward the opposite end of apparatus 10. In this example, second pipe fitting 15B presents a corresponding set of female threads. Initially, second pipe fitting 15B is loosely screwed onto the end of first pipe fitting 15A. As can be seen in FIGS. 1 and 2, a pipe wrench 120 is fitted to second pipe fitting 15B so that pipe wrench handle 120H extends generally normally from axis A. More generally, pipe wrench 120 is a leverage member which presents an elongated member which extends normally with respect to axis A indicated in FIG. 1. This leverage member may be a pipe wrench but also may be any member which is able to be secured the second pipe fitting and which also includes a member that extends normally with respect to axis A. Pipe wrench 120 is mounted to second pipe fitting 15B so that it securely clamps second pipe fitting 15B as second pipe fitting 15B is screwed onto first pipe fitting 15A. The purpose of pipe fitting assembly apparatus 10 is to tightly and securely screw second pipe fitting 15B to first pipe fitting 15A thereby completing a pipe fitting subassembly.

The skilled reader should understand that by "first pipe fitting 15A" the applicant is referring to pipe fitting or pipe connection or even a section of pipe which usually presents male threads at a working end 15A1 which is oriented toward pipe wrench turning portion 20. Working end 15A1 of first pipe fitting 15A may also present female threads. In most cases, the "second pipe fitting 15B" refers to what is known by the skilled reader as a "fitting" or a "connection". Accordingly, by pipe fitting 15B, in this example, the applicant means a fitting or connection selected from a group including but not limited to: 45° fittings, 90° fittings, T fittings, valves, check valves, unions and nipples. These are merely given as examples of the types of fittings and connections pipe fitting assembly apparatus 10 can assemble. The skilled reader should not view the pipe fittings shown in the figures as, in any way, illustrating any particular limitation on the types of pipe fittings and pipe connections that can be assembled by pipe fitting assembly apparatus 10. Pipe fitting assembly apparatus 10 is operable for assembling a vast variety of pipe fittings and pipe connections which are so numerous and varied that it is not practicable to illustrate and describe all of them or even a significant portion of them.

Figure 3:
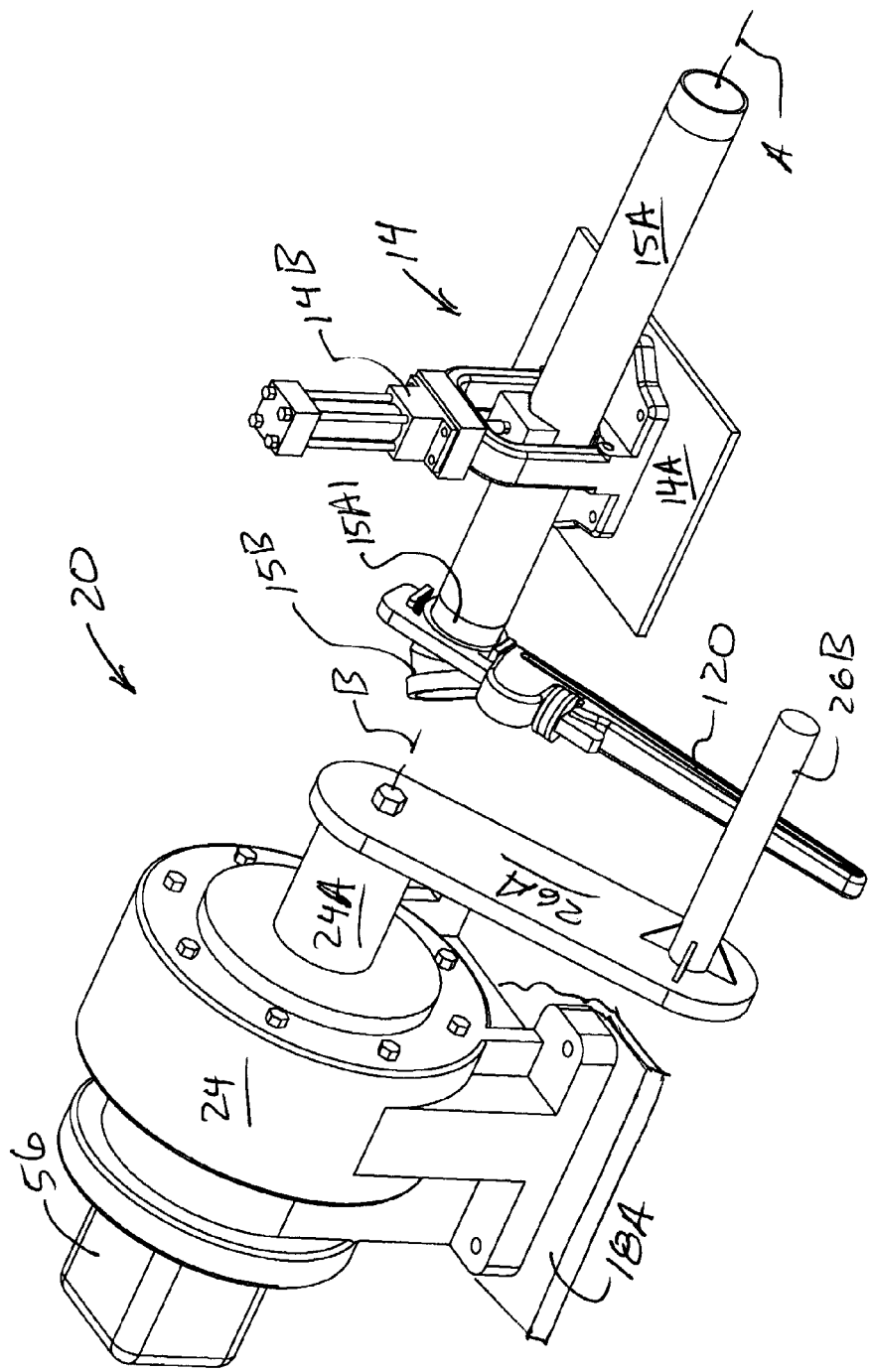
FIG. 3 is a close up perspective view of the vice assembly and the pipe wrench turning portion of the pipe fitting assembly apparatus.

As is shown in FIGS. 1 and 2 and in more detail in FIG. 3, pipe wrench turning portion 20 includes a hydraulic motor 56, a gear reducer 24 and an arm assembly 26. Pipe wrench turning portion may also be referred to as a leverage member turning portion if a leverage member that is not a pipe wrench, per se, is selected for engaging second pipe fitting 15B. Gear reducer 24 drives a shaft 24A at a moderate speed of approximately 5 to 25 rpm but could be configured to operate well outside that range. Gear reducer 24 is arranged so that shaft 24A turns about an axis of rotation B which is preferably co-axial with an axis of rotation A of pipe fitting assembly 15. Accordingly, it is preferable that one or both of vice assembly 14 and pipe wrench turning portion 20 are adjustable in the transverse and vertical directions in order to accomplish co-axial alignment of the axis A of rotation of pipe fitting assembly 15 and axis B of rotation of shaft 24A. FIG. 4 illustrates how an operator may select one or all of a series of shims 14A-14D to accomplish axial alignment of axes A and B.

Arm assembly 26 includes a radial member 26A which extends normally from shaft 24A and a longitudinal offset member 26B which extends normally from the distal end of radial member 26A and is generally parallel to and spaced away from axis B. Offset member 26B is configured to engage the handle of pipe wrench 120. As shaft 24A rotates, offset member 26 pushes upon the handle of pipe wrench 120 and thereby turns second pipe fitting 15B in relation to first pipe fitting 15A. In order to accomplish this, shaft 24A must be powered by a prime mover such that shaft 24A applies an amount of torque that, in this example, can be significantly larger than the torque that can be applied by a typical worker pushing on the handle of pipe wrench 120. In this example, the amount of torque that can be applied by apparatus 10 on the handle of pipe wrench 120 is sufficient to screw the fittings together to complete a strong joint.

In order to deliver sufficient torque to tighten pipe fitting sub-assembly 15, drive unit 50 is needed to turn gear reducer 24. The configuration of drive unit 50 and gear reducer 24 may be selected from a wide range of possible configurations. In this example, the applicant selected a configuration which includes an IC engine 52 coupled to a hydraulic pump 54 which supplies high pressure hydraulic fluid to a hydraulic motor 56. In this example, IC engine 52 could be a typical 25 hp IC engine. In this example, IC engine 52 is coupled to a hydraulic pump 54. Hydraulic pump 54, in turn, circulates pressurized and controllable hydraulic fluid to hydraulic motor 56 via supply line 56A and return line 56B. And, finally, hydraulic motor 56 is coupled to gear reducer 24 which drives shaft 24A at a reduced speed. The above described arrangement for powering wrench turning portion 20 is merely an example of how wrench turning portion 20 may be powered. The skilled reader will readily appreciate that any one of a number of prime movers and gearing arrangements may be selected to power wrench turning portion 20. Any drive arrangement will be acceptable if it provides sufficient torque at relatively slow speeds as described above.

Pipe wrench turning portion 20 and drive unit 50 are fixed to a frame 18 which, in this example, is mounted for longitudinal translation in relation to base 12 by a pair of spaced, parallel rails 12A. In this example, frame 18 further includes gear reducer stand 18A which supports gear reducer 24 and hydraulic motor 56 in an elevated position as shown in FIGS. 1 and 2. A hydraulic cylinder 142 connects between base 12 and frame 18 for translating pipe wrench turning portion 20 and drive unit 50 between a retracted non-operating position in which offset member 26B does not contact the handle of pipe wrench 120 and an extended operating position in which offset member 26 does engage the handle of pipe wrench 120. The translation of frame 18 (and the components it carries) is actuated by a two-way hydraulic cylinder 142 which connects between base 12 and frame 18. Hydraulic cylinder 142 is also supplied with pressurized hydraulic fluid by hydraulic pump 54. A hydraulic fluid reservoir 162 and is mounted to frame 18 for retaining a supply of hydraulic fluid for hydraulic motor 56. A fuel tank 164 is also mounted to frame 18 for supplying fuel to IC engine. Still further a battery 52A is also mounted to frame 18 for supplying electrical power for the starter motor (not shown) for starting IC engine 52. As shown in FIG. 1, a control set 210 is supported by a control set stand 18B which is, in turn, fixed to gear reducer stand 18A. Control set 210 presents a series of control handles 210A, 210B and 210C which are used by an operator to control the flow of hydraulic fluid between hydraulic pump 54, hydraulic motor 56 and reservoir 162 as well as between hydraulic pump 54 and hydraulic cylinder 142. Accordingly, an operator may control the location of pipe wrench turning portion 20 and drive unit 50 as noted above and an operator may control the speed and direction of rotation of shaft 24A between neutral and maximum speed settings. As noted above, in this example, drive unit 50 is arranged to drive shaft 24A between 0 rpm when in neutral and approximately 5 to 25 rpm when operating.

As the skilled reader can understand from the above detailed description, the pipe fitting assembly apparatus 10 can be used to join threaded pipe fitting sections having relatively large diameters. As those who are familiar with such threaded pipe fitting sections, once a threaded pipe fitting section is significantly larger than two inches, the torque required to properly assembly a properly sealed pipe fitting joint increases geometrically with diameter. The amount of required torque, even with modest diameter of 3 and 4 inches, increases to levels that are beyond what can be safely applied by a worker using even a large pipe wrench. Because of this, significant time is spent trying to assemble such sub-assemblies in the field. And, injuries can result when workers try to arrange make shift apparatuses for augmenting the torque that can be applied with a pipe wrench. By using the pipe fitting assembly apparatus described above, workers can set up a work station wherein pipe fittings may be joined rapidly and safely, thereby reducing the time, costs and risks associated with assembling connections and pipe fittings at oil fields and at any other facility where pipe fittings and pipe connections need to be screwed together.

The skilled reader will also appreciate how hydraulic motor 56 may be controlled to operate in a reverse direction. By selecting a reverse direction for hydraulic motor 56 and arranging pipe wrench 120 in an opposite direction from that shown in the figures, it is possible for an operator to disassemble a pipe fitting sub-assembly. Oil field operations often present situations wherein oil filed tank connections are being replaced or modified and in which it is necessary to disassemble existing fitting sub-assembly. The ability to operate in reverse is an important capability for pipe fitting assembly apparatus 10.

FIG. 4 shows the use of shim plates 14A1, 14A2, 14A3 and 14A4 which are selectively stacked to establish alignment between axis A and axis B. Any one of a number of adjustment means may be selected for establishing proper alignment between axis A and axis B. Although aligning axes A and B is preferable for the operation of pipe fitting assembly apparatus 10, perfect alignment is not absolutely necessary.

FIG. 5 illustrates an optional turn-table vice assembly 214. Turntable vice assembly 214 may be used in lieu of vice assembly 14 shown in FIGS. 1-3. Turntable vice assembly 214, in this example, includes a stand 216, a turntable platform 218, a turntable 222 and vice assemblies 224A, 224B and 224C. Stand 216 is preferably fixed to pipe fitting assembly apparatus base 12 shown in FIGS. 1 and 2 generally in same position as stand 14A shown in FIGS. 1 and 2. Turntable platform 218, in this example, is a disc shaped generally horizontal member which is fixed to stand 216. Turntable 222 is rotatably mounted to plat form 218 but is also capable of being locked in one of at least three selected positions suitable for aligning one of the vice assemblies with a wrench turning portion 20. The rotation of turntable 222 is arranged for rotation about a vertical axis VA indicated in FIG. 5. In this example, three vice assemblies 224A, 224B and 224C are evenly spaced around and fixed to platform 218.

Turntable vice assembly 214 makes it possible for an operator to mount a pipe fitting sub-assembly such as pipe fitting sub-assembly 15 shown in FIG. 1, to a vice assembly while a previously mounted pipe fitting sub-assembly is being acted on by wrench turning portion 20. The addition of the turntable vice assembly 214 makes it possible to increase the rate at which pipe fitting sub-assemblies may be assembled, because sub-assemblies may be mounted to the machine while another sub assembly is being assembled.

It is to be understood that while certain forms of this invention have been illustrated and described, it is not limited thereto, except in so far as such limitations are included in the following claims and allowable equivalents thereof.

Having thus described the invention, what is claimed as new and desired to be secured by Letters Patent is:

1. An apparatus for screwing together and disassembling threaded pipe fittings comprising:
   (a) a base (b) a vice assembly mounted to a stand which is mounted to the base, the vice assembly for securely holding a pipe fitting sub-assembly including a first pipe fitting having a threaded end and a second pipe fitting having a corresponding threaded end, the first pipe fitting securely held by the vice assembly and the second pipe fitting loosely screwed onto the first pipe fitting, the first and second pipe fittings aligned along an axis of rotation, the vice assembly further including a turntable which is mounted at least indirectly to the stand and at least a first vice and a second vice, the at least first and second vices being mounted to the turntable, the turntable being able to rotate and being able to be releasably fixed such that one vice may be placed in a position for holding a pipe fitting sub-assembly for action by the apparatus while at least a second vice is available for accepting at least a second pipe fitting sub-assembly,
   (c) a leverage member secured to the second pipe fitting, the leverage member having a member extending generally normally with respect to the axis of rotation of the pipe fitting sub-assembly,
   (d) a leverage member turning unit which is mounted to the base, the leverage member turning unit including a prime mover, the leverage member turning unit having an axis of rotation and presenting an offset member which is generally parallel to and spaced away from the axis of rotation, the offset member positionable for contacting and urging the normally extending member of the leverage member for causing rotation of the second pipe fitting with respect to the first pipe fitting such that the second pipe fitting is able to be screwed onto the first pipe fitting for assembly or is able to be unscrewed from the second pipe fitting for disassembly if the pipe fitting assembly is assembled and if the rotation of the second pipe fitting occurs in an opposite direction.

2. The apparatus of claim 1, wherein:
   the position of at least one of the vice assembly and the leverage member turning unit is adjustable such that the spacing between the leverage member turning unit and the vice assembly is adjustable.

3. The apparatus of claim 2, wherein:
   the height of the vice assembly is adjustable.

4. The apparatus of claim 1, wherein:
   the prime mover is an internal combustion engine coupled to a hydraulic pump and the leverage member turning unit is driven by a hydraulic motor which is driven by the hydraulic pump.

5. The apparatus of claim 1, wherein:
   the height of the vice assembly is adjustable.

6. An apparatus for screwing together and disassembling threaded pipe fittings comprising:
   (a) a base
   (b) a vice assembly including a stand which is mounted to the base, a turntable which is supported by the stand and at least a first vice and a second vice mounted to the turntable, the turntable being able to rotate and being able to be releasably fixed such that one of the first and second vices may be placed in a first working position for holding a pipe fitting sub-assembly for action by the apparatus while the other of the first and second vices is placed in a second loading position and is available for accepting a second pipe fitting sub-assembly, each of the first and second pipe fitting sub-assemblies including a first pipe fitting and a second pipe fitting, the first pipe fitting being held by one of the at least two vices, the first pipe fitting having a threaded end and the second pipe fitting being loosely screwed onto the first pipe fitting and wherein the first and second pipe fittings each are aligned along an axis of rotation of the respective pipe fitting sub-assembly, (c) a leverage member secured to the second pipe fitting of the pipe fitting sub-assembly which is in the first working position, the leverage member having a member extending generally normally with respect to the axis of rotation of the pipe fitting sub-assembly, (d) a leverage member turning unit including a prime mover mounted to the base, the leverage member turning unit having an axis of rotation and presenting an offset member which is generally parallel to and spaced away from the axis of rotation, the offset member positionable for contacting and urging the normally extending member of the leverage member for causing rotation of the second pipe fitting of the pipe fitting assembly which is in the first working position with respect to the first pipe fitting of the pipe fitting assembly which is in the first working position such that the second pipe fitting is screwed onto the first pipe fitting.

7. The apparatus of claim 6, wherein:
the leverage member is a pipe wrench.

8. The apparatus of claim 6, wherein:
the prime mover is an internal combustion engine coupled to a hydraulic pump and the leverage member turning unit is driven by a hydraulic motor which is driven by the hydraulic pump.

9. The apparatus of claim 6, wherein:
the position of at least one of the vice assembly and the leverage member turning unit is adjustable such that the spacing between the leverage member turning unit and the vice assembly is adjustable.

10. The apparatus of claim 9, wherein:
the height of the vice assembly is adjustable.

\* \* \* \* \*